United States Patent
Sterz et al.

(10) Patent No.: US 7,518,340 B2
(45) Date of Patent: Apr. 14, 2009

(54) METHOD AND SYSTEM FOR CHARGE RATE ADJUSTMENT TO ENHANCE BATTERY CYCLE LIFE

(75) Inventors: Stephen D. Sterz, Hutto, TX (US); Ligong Wang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/300,721

(22) Filed: Dec. 15, 2005

(65) Prior Publication Data
US 2007/0139008 A1 Jun. 21, 2007

(51) Int. Cl.
*H02J 7/00* (2006.01)
(52) U.S. Cl. ........................................ 320/132; 320/131
(58) Field of Classification Search .................. 320/112, 320/114, 160, DIG. 12, 132, 131
See application file for complete search history.

(56) References Cited

U.S. PATENT DOCUMENTS

| | | | | |
|---|---|---|---|---|
| 3,816,806 A | * | 6/1974 | Mas | 320/129 |
| 4,755,735 A | | 7/1988 | Inakagata | 320/150 |
| 5,179,335 A | * | 1/1993 | Nor | 320/159 |
| 5,254,931 A | * | 10/1993 | Martensson | 320/114 |
| 5,412,306 A | | 5/1995 | Meadows et al. | 320/139 |
| 5,557,188 A | | 9/1996 | Piercy | 320/134 |
| 5,561,360 A | | 10/1996 | Ayres et al. | 320/129 |
| 5,565,759 A | | 10/1996 | Dunstan | 320/48 |
| 5,621,302 A | * | 4/1997 | Shinohara | 320/148 |
| 5,637,981 A | | 6/1997 | Nagai et al. | 320/160 |
| 5,680,031 A | * | 10/1997 | Pavlovic et al. | 320/160 |
| 5,821,736 A | | 10/1998 | Yeon | 320/148 |
| 5,994,878 A | | 11/1999 | Ostergaard et al. | 320/132 |
| 6,060,865 A | * | 5/2000 | Chen | 320/139 |
| 6,081,097 A | | 6/2000 | Seri et al. | 320/128 |
| 6,137,268 A | | 10/2000 | Mitchell et al. | 320/149 |
| 6,204,634 B1 | | 3/2001 | Zimmerman et al. | 320/128 |
| 6,222,347 B1 | | 4/2001 | Gong | 320/137 |
| 6,337,560 B1 | * | 1/2002 | Kalogeropoulos et al. | 320/160 |
| 6,495,992 B1 | * | 12/2002 | Pavlovic | 320/161 |
| 2005/0194933 A1 | | 9/2005 | Arnold et al. | 320/128 |

OTHER PUBLICATIONS

Austrian Patent Office, Service and Information Center (TRF), Application No. 200608247-3, "Search Report and Written Opinion," Jun. 14, 2007.

* cited by examiner

*Primary Examiner*—Akm E Ullah
*Assistant Examiner*—Samuel Berhanu
(74) *Attorney, Agent, or Firm*—O'Keefe, Egan, Peterman & Enders, LLP (57) ABSTRACT

Methods and systems are disclosed for charge current adjustment to enhance battery cycle life thereby allowing batteries to be charged quickly without accelerating the aging process of the battery. As the charge capacity of the battery degrades over time, the charge current for the battery charging cycles is also reduced so that the effective charge rate for the battery is adjusted to account for the reduction in charge capacity. In this way, battery capacity life is enhanced by avoiding an accelerated charge rate as the battery capacity drops over the operational life of the battery. The methods and systems disclosed are useful for battery-powered information handling systems, as well as other devices where fast charging and long cycle life is desirable, such as cell phones, personal digital assistants (PDAs), electric vehicles and/or any other battery powered devices.

18 Claims, 4 Drawing Sheets

METHOD AND SYSTEM FOR CHARGE RATE ADJUSTMENT TO ENHANCE BATTERY CYCLE LIFE

TECHNICAL FIELD OF THE INVENTION

This invention relates to techniques for the management of batteries utilized in information handling systems and, more particularly, to the charging of such batteries.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling system, such as notebook computer systems, are designed to operate on battery power and/or power from a powered outlet. With respect to battery operation, end-user customers often demand that batteries must charge quickly and last for many charging cycles. For example, with respect to information handling systems available from DELL, these customer demands have been translated to requirements that the battery be charged to 80% of its charge capacity within one hour, that the battery be fully charged within two-hours, and that the battery have at least 75% of rated capacity after 300 charging cycles. Unfortunately, the faster a battery is charged during its charging cycles, the faster its capacity decreases over time. When the capacity decreases, the relative charge rate increases. This increase makes the capacity decrease even faster. In previous generations of batteries (e.g., 1.6, 1.8, 2.0, 2.2 and 2.4 Ampere hours (Ah)) there has typically been enough design margin to overcome this problem. However, the generation of cells currently under development (e.g., 2.6 Ah and beyond) are typically being optimized for initial charge capacity, and so they cannot maintain cycle life performance at high charge rates.

With certain charging methods currently in use, the battery is charged at a constant charge current or rate until it reaches a maximum voltage. The charger then maintains this maximum voltage while continuing the charging process (e.g., using pulsed charges) until the current decreases to a preset limit at which time the charging cycle concludes. Typically, the constant current and maximum voltage do not change as the battery ages and loses charge capacity, so the charge rate effectively increases as the battery ages. For example, if a fixed charge current is selected based upon initial charge capacity (C) such that the charge current will charge the battery to 80% of its capacity within one hour (which is designated as a charge current or rate of 0.8 C), the effective charge current will increase as the battery charge capacity degrades over time. For example, a battery that initially has 5.2 Ah of capacity may be charged at a fixed charge current of 0.8 C or 4.16 A (i.e., 80% in one hour times 5.2 Ah). After 100 cycles, however, the capacity may have dropped, for example, to a new charge capacity ($C_{NEW}$) of about 4.6 Ah. The charge rate is still constant, however, at 4.16 A thereby making the effective charge rate about 0.9 $C_{NEW}$. Thus, as the battery ages and its charge capacity degrades, the battery is being charged at an ever increasing effective charge rate. This increased charge rate then further hastens the degradation in charging capacity because the battery is being effectively charged faster and faster. Reducing the charge rate (e.g., to about 0.5 C) may allow the battery to meet cycle life requirements by reducing the amount of capacity loss; however, the battery may no longer meet desired charge time requirements. Thus, the current fixed charge current solutions for charging batteries are not effective solutions.

SUMMARY OF THE INVENTION

The present invention provides methods and systems for charge current adjustment to enhance battery cycle life thereby allowing batteries to be charged quickly without accelerating the aging process of the battery. As the charge capacity of the battery degrades over time, the charge current for the battery charging cycles is also reduced so that the effective charge rate for the battery is adjusted to account for the reduction in charge capacity. In this way, the present invention enhances battery capacity life by avoiding an accelerated charge rate as the battery capacity drops over the operational life of the battery. The present invention is useful for battery-powered information handling systems, as well as other devices where fast charging and long cycle life is desirable, such as cell phones, personal digital assistants (PDAs), electric vehicles and/or any other battery powered devices.

In one embodiment, the present invention is a method of managing a charge rate for a battery, including utilizing a first charge rate to charge a battery where the first charge rate being based at least in part upon a charge capacity for the battery, reducing the charge rate for the battery to a new charge rate based at least in part upon a reduction in the charge capacity for the battery, and charging the battery with the new charge rate. In further embodiments, the method relies upon a determination of a current charge capacity for the battery, and the method can include determining the current charge capacity for the battery at least in part from data associated with operation of the battery within an information handling system and repeating the reducing and charging steps as the information handling system is operated over time. Still further, the method can include utilizing an expected charge capacity degradation rate for the charge capacity of the battery in order to make the reductions in the charge rate. The method can also include reducing the charge rate at regular intervals based upon the expected degradation rate for the battery, and the regular intervals can be based upon charge cycle count data for the battery. As described below, other features and variations can be implemented, if desired, and related systems can be utilized, as well.

In another embodiment, the present invention is a system for an information handling system configured to be powered by a battery or an alternating current to direct current (AC/DC) converter, including an alternating current to direct current (AC/DC) converter, a load coupled to the AC/DC converter, the load representing powered circuitry for an information handling system, a charger coupled to the AC/DC converter, a battery coupled to the charger and to the load, and a battery management unit (BMU) configured to adjust a charge rate for the battery based at least in part upon changes charge capacity for the battery. In a further embodiment, the BMU can be configured to adjust the charge rate based upon a determination of a current charge capacity for the battery. The BMU can also be configured to determine the current charge capacity at least in part from data associated with operation of the battery within the information handling system, and the BMU can be configured to repeat this determination and to reduce the charge rate based upon reductions in the charge capacity as the information handling system is operated over time. Still further, the BMU can be configured to reduce the charge rate based upon an expected charge capacity degradation rate for the battery, and the BMU can further be configured to reduce the charge rate at regular intervals as the information handling system is operated over time based upon the expected degradation rate for the battery. Still further, the regular intervals are based upon charge cycle count data for the battery. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention relates to management of batteries used by information handling systems and, more particularly, to managing charge currents for such batteries. According to the present invention, as the charge capacity of the battery degrades over time, the charge current for the battery charging cycles is also reduced so that the effective charge rate for the battery is adjusted to account for the reduction in charge capacity. In this way, the present invention improves battery cycle life while still meeting charge time requirements by reducing the charge rate as the capacity of the battery decreases. In addition to being useful for battery-powered information handling systems, the present invention is also useful for other devices where fast charging and long cycle life is desirable, such as cell phones, personal digital assistants (PDAs), electric vehicles and/or any other battery powered devices.

As discussed above, the charge current and maximum voltage used to charge a battery can significantly affect the cycle life of the battery. With traditional charging techniques, the charge current values are fixed for the life of the battery. In contrast, according to the present invention, the charge currents are adjusted and/or set to different values depending on the measured and/or estimated state of the battery capacity. The current and voltage utilized for charging can be based on a number of factors including but not limited to: (1) actual battery full charge capacity (FCC), (2) number of charging cycles used, and/or (3) battery temperature. Other parameters can also be utilized to achieve the operational results desired for the battery and/or for the information handling system using the battery.

In operation, the BIOS (basic input/output system) for the information handling system often reads charge current and voltage from the battery at the beginning of each charge cycle and during the charge cycle. These measurements, for example, could be used to implement the present invention, if desired, such that no system-side changes would be necessary for the information handling system. The battery management unit (BMU) that is part of the battery and charger could instead be configured calculate the current and voltage to utilize in order to meet charge time requirements while still improving or maximizing cycle life according to the present invention. Thus, the BMU or other management/control circuitry associated with the battery and/or the charger could be configured to manage the battery and the charging of the battery, as desired, in order to implement the present invention. As discussed below, depending upon the operational results desired for a particularly system, a variety of techniques can be implemented and managed in order to reduce the charge rate based upon degradations in the charge capacity of the battery according to the present invention.

To apply numbers to an example embodiment, an environment is assumed in which a battery for an information handling system is initially configured such that the charge current will charge the battery to 80% of its capacity within one hour (i.e., charge rate of 0.8 C), the effective charge current will increase as the battery charge capacity degrades over time. The battery being utilized by a information handling system has 5.2 Ah of initial design capacity (C). Thus, the system is configured to initially charge the battery at 0.8 C or 4.16 A (i.e., 80% of capacity in one hour times 5.2 Ah). After 200 cycles, for example, the capacity may have dropped to 4.6 Ah. In contrast to the prior art fixed charge current example above, the charge rate according to the present invention is adjusted to account for this actual or expected reduction in charge capacity. For example, if desired, the battery could now be charged with a charge current of 0.8 $C_{NEW}$ or 3.68 A, where $C_{NEW}$ represents the new charge capacity of the battery after its performance has degraded over the first 200 charging cycles of its operation. By reducing the charge rate as the capacity decreases according to the present invention, the charge rate can be normalized with respect to current charge capacity throughout the life of the battery thereby improving cycle life while still meeting the desired charge time requirement.

Management of the charge current can be preferably implemented as part of smart charger systems available for battery operated systems including information handling systems, such as notebook computers. Thus, adjustments to charge current according to the present invention can be done utilizing these smart chargers thereby extending battery cycle life without requiring modifications to the information handling system itself. These charge rate adjustments can be determined and implemented in a variety of ways, including using one or more of the following with respect to information handling systems:

Battery management unit (BMU) solution—use battery register data from SMBus (System Management Bus) to update required charge current Keyboard controller (KC)/embedded controller (EC) solution—use information polled from battery registers on SMBus to calculate cell degradation rate and adjust charge current sent to charger Charger solution—use information either from KC/EC or directly from battery to modulate charge current. The frequency to update charge current will depend on the functionality of charger/BMU, performance expectation and cell degradation rate. With this technique, cycle life is expected to prolong by 5% to 10% for charge rate requirements such as those discussed herein or similar featured batteries.

As indicated above, a variety of techniques can be utilized to implement the present invention. In one implementation, the charge current adjustments can be based upon the full charge capacity (FCC) data for the battery as stored by the information handling system. While reducing charge current every time FCC is reduced is an efficient technique for implementing the present invention, some users may not discharge their batteries deeply enough to reset FCC (e.g., it may require discharging a battery to below about 7% capacity to reset FCC). The result is that the battery might go through a large number of charging cycles without having the charge current reduced. As such, the effectiveness of this FCC-based technique may be greatly reduced under actual user operating conditions. In other implementations, therefore, different techniques may be used to implement the present invention other than relying upon the FCC data.

One such different technique is to reduce the charge current based on the expected battery cell degradation rate. The expected battery degradation rate, as well as charge rate adjustments, can be determined and implemented in a variety of ways. In one such embodiment, for example, reductions based upon the expected battery degradation rate could be made at regular intervals based upon the cycle count. And these reductions could be implemented by making step adjustments in the charge rate at selected cycle count intervals (e.g., every 1, 15, 20, 50 or other desired number of charging cycles). In this way, the user does not have to discharge the battery enough to have the FCC value reset in order to get the benefit of increased cycle life provided by the present invention. Charge time requirements are met over time without sacrificing battery life by adjusting charge current based on battery cell degradation rates.

Figure 1:
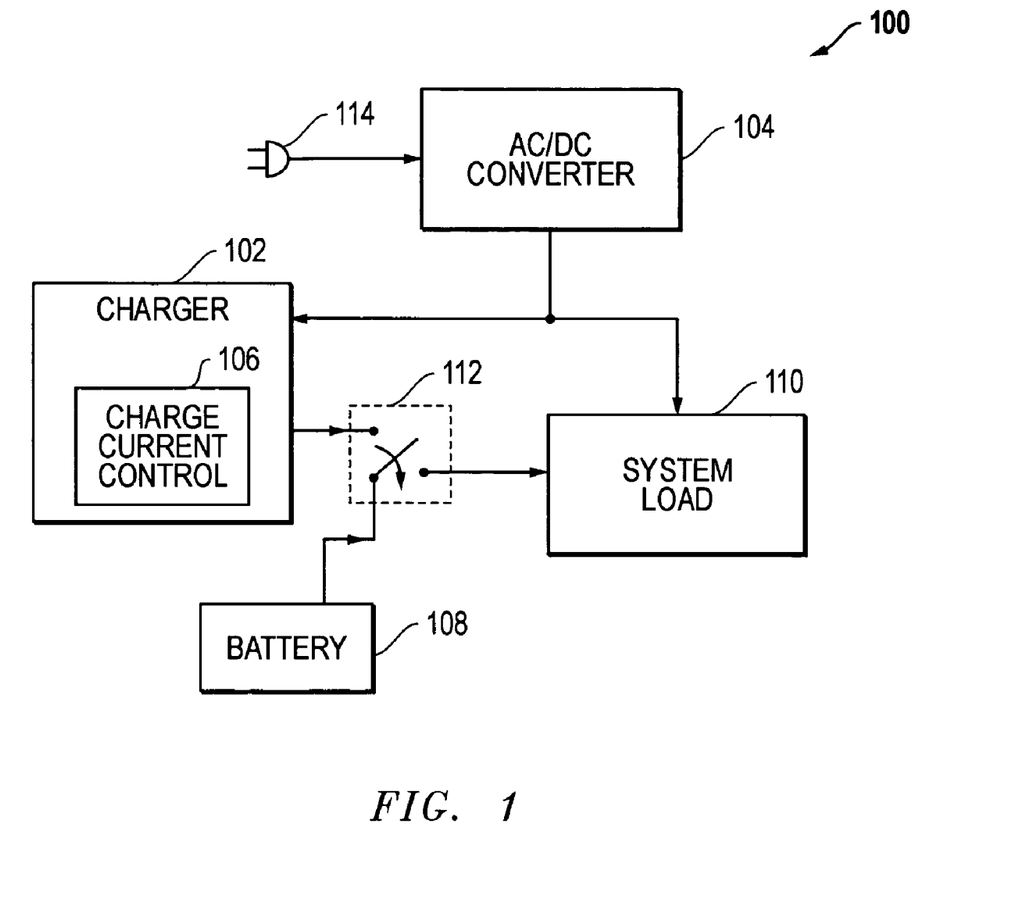
FIG. 1 is a block diagram for an information handling system that utilizes a battery and a charger to charge the battery when plugged into a power source.
Figure 2:
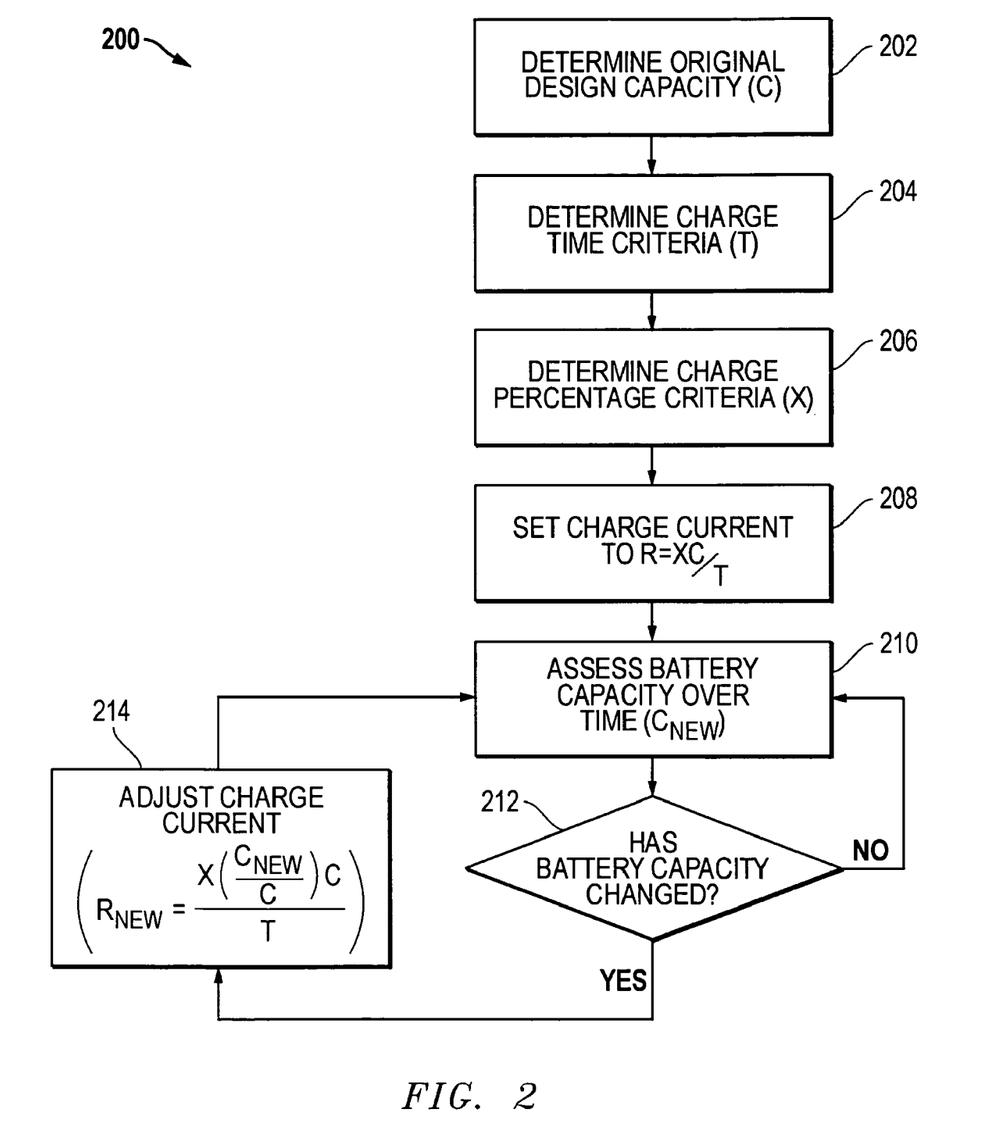
FIG. 2 is a process diagram for adjusting the current charge depending upon the actual and/or projected current charge capacity of the battery.
Figure 3:
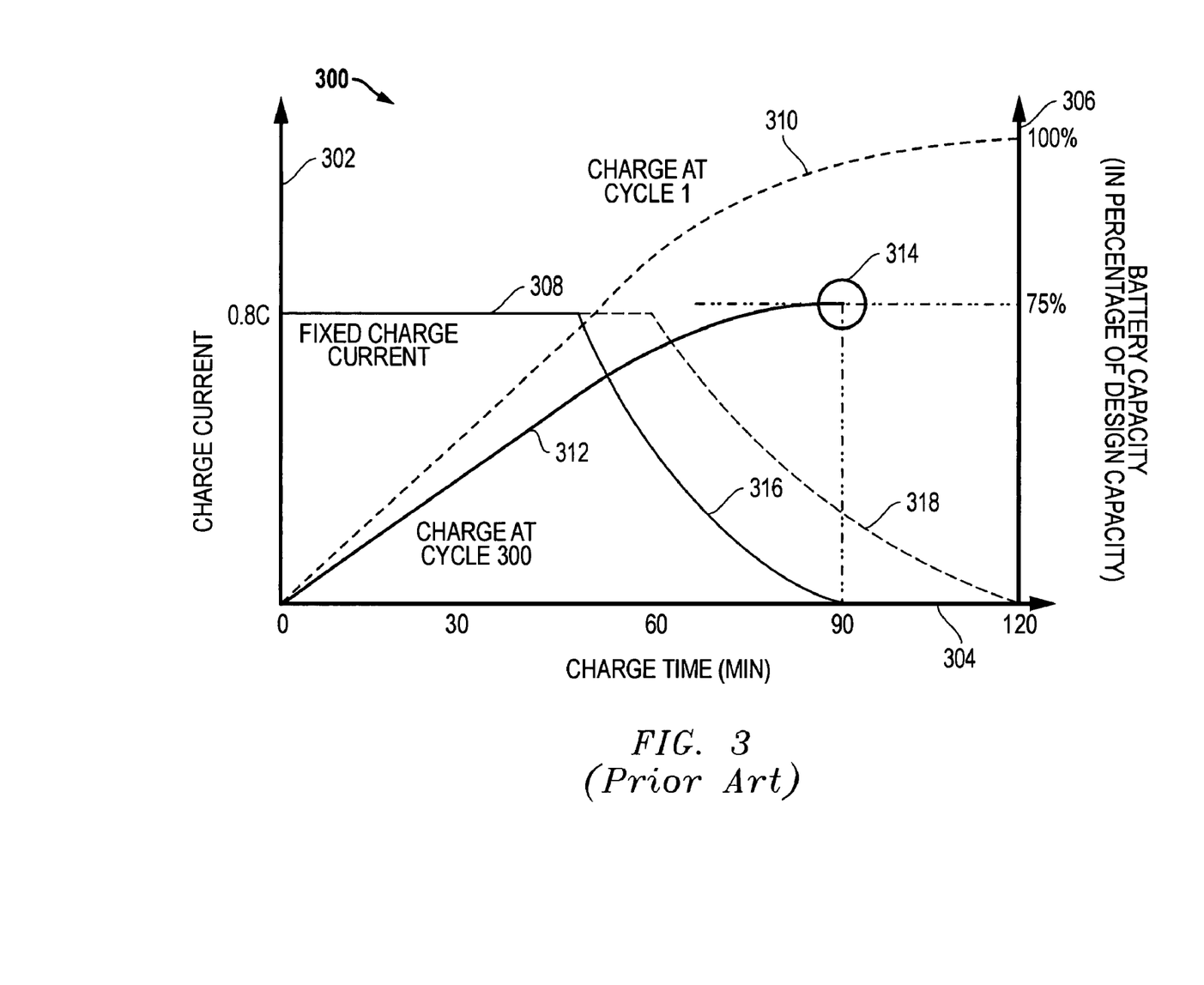
FIG. 3 (prior art) is a graphical diagram depicting a prior charging solution that utilized a fixed charge current regardless of current battery charge capacity.
Figure 4:
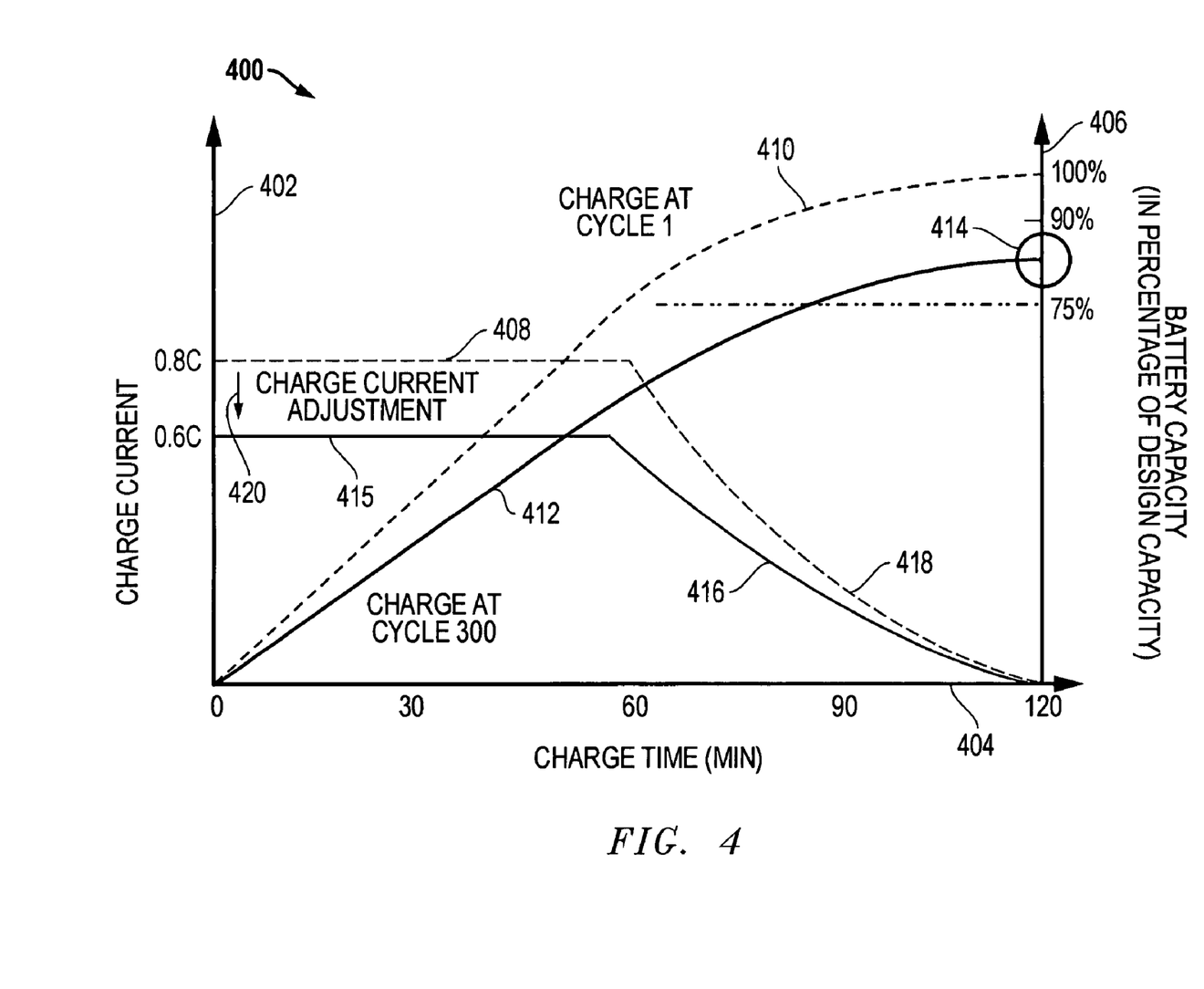
FIG. 4 is a graphical diagram depicting a dynamic charging solution according to the present invention where charge current is adjusted based upon the actual and/or projected current charge capacity of the battery.

Example embodiments for the present invention will now be described with respect to the drawings. FIG. 1 is an example block diagram for an information handling system that utilizes a battery and a charger to charge the battery when plugged into a power source. FIG. 2 is a process diagram for adjusting the current charge depending upon the actual and/or projected current charge capacity of the battery. FIG. 3 (prior art) is a graphical diagram depicting a prior charging solution that utilized a fixed charge current regardless of current battery charge capacity. And FIG. 4 is a graphical diagram depicting a dynamic charging solution according to the present invention where charge current is adjusted based upon the actual and/or projected current charge capacity of the battery. It is again noted that although the present invention is useful for battery-powered information handling systems, the present invention is also useful for other devices where fast charging and long cycle life is desirable, such as cell phones, personal digital assistants (PDAs), electric vehicles and/or any other battery powered devices.

Looking now to FIG. 1, a block diagram is depicted for an information handling system 100 that utilizes a battery 108 and a charger 102 to charge the battery 108 when plugged into a power source. As depicted, the plug 114 is configured to be plugged into a wall power socket and is coupled to an AC/DC converter 104. The AC/DC converter 104 is in turn coupled to provide power to the information handling system load 110. In addition, the AC/DC converter 104 is coupled to provide power to the charger 102. The switch 112 is utilized to allow the battery to connect to charger 102 in order to be charged or to connect to the information handling system load 110 in order to provide battery power to the information handling system load 110 when there is no external power supply connected. According to the present invention, the charger 102 includes a charge current control block 106 as part of the battery management unit (BMU), and this charge current control block 106 operates to adjust and manage the charge current applied to the battery 108 during charging.

FIG. 2 is a process diagram 200 for adjusting the current charge depending upon the actual and/or projected current charge capacity of the battery. As depicted, in block 202, a determination is made concerning the original charge capacity of the battery, which is designated herein as "C" and is typically represented by an amount in units of milli-Amp-hours (mAh). Next, in block 204, a charge time criteria is determined, which is designated herein as "T" and represents an amount of time. In block 206, a charge percentage criteria is determined, which is designated as "X." In block 208, these parameters are utilized to set a charge current for the battery 108, which is designated as "R" and has the units of milli-Amps. In particular, the charge current can be represented by the following equation: $R=XC/T$. Thus, for the examples discussed above, X was selected as 80% or 0.8. T was selected as one hour. C was 5.2 Ah. As such, the original charge current or rate (R) was 4.6 A ($R=XC/T=0.8(5.2 \text{ Ah})/1\text{ h}=4.6\text{ A}$). It is noted that other techniques could be used for determining or selecting the desired charge rate depending upon the operational results desired to be achieved.

With prior solutions, the charge current would be a fixed parameter. As discussed above, a battery typically loses charge capacity each time it goes through a charge cycle, and the amount of charge capacity lost increases as the rate at which the battery is charged is increased. Over time, therefore, as the charge capacity of the battery drops, the effective charge rate for the battery goes up with prior solutions because the charge current remains constant while the actual charge capacity degrades. The charge rate, therefore, effectively increases. Because the battery is now being charge more quickly towards its maximum charge capacity, the charge capacity degradation starts increasing at ever increasing rate. According to the present invention, rather than maintain a fixed charge current, the charge current is adjusted over time in order to normalize or reduce the effective charge rate thereby improving the charge capacity of the battery and reducing the rate of capacity loss for the battery over its lifetime.

Looking back to the example embodiment of FIG. 2, this intelligent adjustment of the battery charge current is implemented through process blocks 210, 212 and 214. In block 210, the actual and/or expected battery charge capacity is assessed over time. As discussed herein, the timing for these determinations and the technique used to make these determinations can be selected and configured, as desired, in order to achieve the operational objectives set for the battery or information handling system environment. In decision block 212, a determination is made whether the battery charge capacity has changed. If "NO," then flow passes back to block 210. If "YES," the flow passes to block 214. In block 214, the charge current is adjusted to a new charge current ($R_{NEW}$) based upon the new charge capacity determination. Thus, as depicted, the new charge current ($R_{NEW}$) is represented by the equation: $R_{NEW} = [(X(C_{NEW}/C)C]/T$. Flow then passes back to block 210 where the loop continues over the life of the battery according to the algorithm selected for assessing changes in battery capacity over time. For example, if the charge capacity fell from 5.2 Ah to 4.6 Ah over the first 200 cycles of operation of the battery, the new charge rate could be set at 3.68 A or 0.71 C (i.e., $R_{NEW} = [(X(C_{NEW}/C)C]/T = [0.8(4.6/5.2)5.2]/1 = 3.68$ A or 0.71 C].

FIG. 3 (prior art) is a graphical diagram 300 depicting a prior charging solution that utilized a fixed charge current regardless of current battery charge capacity. As depicted, the left y-axis 302 represents charge current based upon a percentage of the original charge capacity (C). The x-axis 304 represents charge time in minutes. The right y-axis 306 represents battery capacity in percentage of designed charge capacity (C). For this example, the charging criteria is assumed to be that the battery should be charged to 80% of its design capacity within one hour and should be fully charged within two hours. As such, the fixed charge current is 0.8 C divided by one hour. Line 308 represents this fixed charge current and is represented by 0.8 C. As discussed above, as a battery charges it will initially pull the available current. However, at some point, the battery will begin pulling a lower current. And this current draw continues to drop until the battery is fully charged to its current charge capacity.

The example graphical diagram 300 of FIG. 3 (prior art) includes representative information for a first charging cycle (CYCLE 1) for a battery and for three-hundredth charging cycle (CYCLE 300) for a battery. With respect to CYCLE 1, line 308 followed by dotted line 318 represent the charge current drawn by the battery as it charges over a two hour period. As shown, near the 60 minute mark, the charge current begins a drop towards zero at 120 minutes at which time the battery is fully charged. Also with respect to CYCLE 1, dotted line 310 represents the percentage charged for the battery until it is charged to full capacity. As depicted, the percentage charged asymptotically approaches 100% at about 120 minutes at which time it has reached its full battery design capacity.

With respect to CYCLE 300, line 308 followed by line 316 represent the charge current drawn by the battery as it charges. As shown, near the 50 minute mark, the charge current begins to drop towards zero at 90 minutes at which time the battery is fully charged to its current charge capacity, which is 75% of the original design capacity. Also with respect to CYCLE 300, bold line 312 represents the percentage charge for the battery as it is charged to full capacity. As depicted, the percentage charge asymptotically approaches its current full capacity at about 90 minutes. As designated by circle 314, this full capacity level is about 75% of the original design charge capacity for the battery. Thus, over the first 300 charging cycles, the battery has lost 25% of its original charge capacity. As such, the effective charge rate for the battery is significantly faster than the 80% charged in one hour criteria originally selected because the charge current was fixed at 0.8 C based upon "C" being the design capacity of the battery. Thus, with the actual capacity being reduced, the charge rate causes the battery to be charged to 80% of its current capacity in under one hour and to its full capacity in well less than two hours (e.g., 90 minutes as shown in FIG. 3 (prior art)).

FIG. 4 is a graphical diagram 400 depicting a dynamic charging solution according to the present invention where charge current is adjusted based upon the actual and/or projected current charge capacity of the battery. As depicted, the left y-axis 402 represents charge current based upon a percentage of the original charge capacity (C). The x-axis 404 represents charge time in minutes. The right y-axis 406 represents battery capacity in percentage of designed charge capacity (C). For this example, the initial charging criteria is again assumed to be that the battery should be charged to 80% of its design capacity within one hour and should be fully charged within two hours. As discussed above, as a battery charges it will initial pull the available current. However, at some point, the battery will begin pulling a lower current. And this current draw continues to drop until the battery is fully charged to its current charge capacity.

The example graphical diagram 400 of FIG. 4 includes representative information for a first charging cycle (CYCLE 1) for a battery and for three-hundredth charging cycle (CYCLE 300) for a battery. According to the present invention, the charge rate is adjusted over time to account for the actual and/or expected reduction over time in charge capacity for the battery. As represented by element 420 in FIG. 4, the charge current can be adjusted by reducing the charge current over time in proportion to the actual and/or expected reduction in the full charge capacity of the battery. The particular techniques and/or algorithms utilized to make this adjusted can be selected, as desired, to achieve the desired performance results. For example, assuming the charging criteria is to charge the battery to 80% of its current charge capacity within one hour, the charge rate can be adjusted proportional with respect to the loss of charge capacity so that the charge current is maintained at 0.8 $C_{NEW}$ where $C_{NEW}$ represents the current charge capacity of the battery. As discussed with respect to FIG. 2, this can also be viewed as adjusting the charge percentage with respect to the original design capacity (C), such that the new charge percentage ($X_{NEW}$) becomes $0.8(C_{NEW}/C)$. The charge current applied can then be $X_{NEW}C$. Looking to FIG. 4, therefore, the charge current has been reduced to 0.6 C for CYCLE 300.

In a more particular example, a battery can be tested to determine what its capacity loss over time would be if a fixed charge rate of 0.8 C were utilized over a selected number of charging cycles. A charge rate reduction table could then be created that would allow for the charge rate to be reduced across this selected number of cycles in proportion with the expected charge capacity degradation rate. When a customer information handling system is then put into service, this charge reduction rate information can be utilized such that the charge rate is reduced over time along with the expected charge rate degradation of the battery. For example, the charge rate could be adjusted down in a stepped fashion every 15 charging cycles. Looking at the example of FIG. 4 below, if the charge rate were reduced from 0.8 C to 0.6 C over the first 300 charging cycles, the charge rate could be stepped down by 0.01 C ever 15 charging cycles. Thus, after 75 charging cycles, the charge rate would be 0.75 C. After 150 charging cycles, the charge rate would be 0.7 C. After 225 charging cycles, the charge rate would be 0.65 C. And after 300 charging cycles, the charge rate would be 0.6 C. These downward steps could be continued at the same or different amount as the battery undergoes additional charging cycles past 300.

Looking back to FIG. 4, with respect to CYCLE 1, dotted line 408 followed by dotted line 418 represent the charge current drawn by the battery as it charges over a two hour period. As shown, the charge current is 0.8 C initially, and near the 60 minute mark, the charge current begins is drop towards zero at 120 minutes at which time the battery is fully charged. Also with respect to CYCLE 1, dotted line 410 represents the percentage charged for the battery as it is charged to full capacity. As depicted, the percentage charged asymptotically approaches 100% at about 120 minutes at which the battery has reached its full design charge capacity.

With respect to CYCLE 300, line 415 followed by line 416 represent the charge current drawn by the battery as it charges. As shown, the charge current is 0.6 C initially, and near the 60 minute mark, the charge current begins to drop towards zero at 120 minutes at which time the battery is fully charged. Also with respect to CYCLE 300, bold line 412 represents the percentage charge for the battery as it is charged to full capacity. As depicted, the percentage charged asymptotically approaches 100% at about 120 minutes at which time it has reached its current charge capacity. As designated by circle 414, this current full charge capacity level is above about 80% of the original design charge capacity for the battery. Thus, over the first 300 charging cycles, the lost battery capacity has been reduced with respect to the loss experienced in the prior art solution of FIG. 3 (prior art) where a fixed charge rate of 0.8 C is maintained.

It is noted that the example embodiment 400 of FIG. 4 represents a situation where the downward adjustment of the charge rate is not being conducted such that the charge rate is kept constant with respect to the actual current charge capacity of the battery. As discussed above, using the actual current charge capacity of the battery, the charge rate would be at 0.8 $C_{NEW}$ or in other terms 0.8($C_{NEW}$/C)C. As depicted in FIG. 4 at CYCLE 300, the current charge capacity is above about 80% of the design capacity. As such, assuming the current charge capacity was in fact 80% of the design capacity, the charge rate would be 0.8 $C_{NEW}$ or 0.64 C. As shown, the charge rate has been adjusted down to 0.6 C. Thus, for this example, the expected capacity loss of a battery being charged at a fixed charge rate, as shown in FIG. 3 (prior art), is being utilized. This expected value of 75% of the design capacity leads to a charge rate of 0.8 $C_{NEW}$ or 0.6 C, which is the initial charge rate for CYCLE 300 in FIG. 4 as represented by line 415. It is again noted that a wide variety of techniques and algorithms could be utilized to adjust the charge current based upon actual and/or expected changes in the charge capacity of the battery over its operational life.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method of managing charge rates for a battery to reduce total battery charge capacity degradation over time, comprising:

for a first charge cycle, determining a first charge current (R) for a battery to charge the battery to a percentage (X) of a total battery charge capacity (C) for the battery in an amount of time (T) according to a relationship R=XC/T;

utilizing the first charge current to charge the battery toward the total battery charge capacity (C) for the battery in the first charge cycle;

for a subsequent charge cycle, determining a reduction in the total battery charge capacity for the battery to a reduced total battery charge capacity ($C_{NEW}$) and determining a new charge current ($R_{NEW}$) for the battery to charge the battery to the percentage (X) of the reduced total battery charge capacity ($C_{NEW}$) for the battery in the amount of time (T) according to a relationship $R_{NEW}$=X($C_{NEW}$/C)C/T;

charging the battery toward the reduced total battery charge capacity ($C_{NEW}$) for the battery in the subsequent charge cycle with the new charge current ($R_{NEW}$), the new charge current ($R_{NEW}$) being applied in the subsequent charge cycle to reduce a rate of charge for the battery.

2. The method of claim 1, further comprising using a design total battery charge capacity of the battery in determining the total battery charge capacity (C).

3. The method of claim 1, further comprising determining a current total battery charge capacity for the battery in determining the reduced total battery charge capacity ($C_{NEW}$).

4. The method of claim 3, further comprising determining the current total battery charge capacity for the battery at least in part from data associated with operation of the battery within an information handling system as the information handling system is operated over time.

5. The method of claim 4, wherein the data comprises a full charge capacity (FCC) data for the battery, temperature data for the battery, or a charge cycle count data for the battery, or a combination thereof.

6. The method of claim 1, further comprising utilizing an expected total battery charge capacity degradation rate for the total battery charge capacity of the battery in determining the new charge current ($R_{NEW}$).

7. The method of claim 6, further comprising determining new charge currents for a plurality of subsequent charge cycles at regular intervals based upon the expected degradation rate for the battery.

8. The method of claim 7, wherein the regular intervals are based upon charge cycle count data for the battery.

9. The method of claim 1, wherein the percentage (X) is 80% and the selected amount of time (T) is 1 hour.

10. An information handling system configured to be powered by a battery or an alternating current to direct current (AC/DC) converter, comprising:

an alternating current to direct current (AC/DC) converter;
a load coupled to the AC/DC converter, the load representing powered circuitry for an information handling system;
a charger coupled to the AC/DC converter;
a battery coupled to the charger and to the load; and
a battery management unit (BMU) configured to determine for a first charge cycle a first charge current (R) for a battery to charge the battery to a percentage (X) of a total battery charge capacity (C) for the battery in an amount of time (T) according to a relationship R=XC/T, to use the first charge current to charge the battery toward the total battery charge capacity (C) for the battery in a the first charge cycle, to determine for a subsequent charge cycle a reduction in the total battery charge capacity for the battery to a reduced total battery charge capacity ($C_{NEW}$); to determine a new charge current ($R_{NEW}$) for the battery to charge the battery to the percentage (X) of the reduced total battery charge capacity ($C_{NEW}$) for the battery in the amount of time (T) according to a relationship $R_{NEW}=X(C_{NEW}/C)C/T$, and to use the new charge current ($R_{NEW}$) in the subsequent charge cycle to charge the battery toward the reduced battery charge capacity ($C_{NEW}$) for the battery;
wherein the first charge current is applied in the first charge cycle and the new charge current is applied in the subsequent charge cycle to reduce a rate of charge for the battery.

11. The information handling system of claim 10, wherein the BMU is configured to use a design total battery charge capacity of the battery in determining the total battery charge capacity (C).

12. The information handling system of claim 10, wherein the BMU is configured to use a determination of a current total battery charge capacity for the battery in determining the reduced total battery charge capacity ($C_{NEW}$).

13. The information handling system of claim 12, wherein the BMU is configured to determine the current total battery charge capacity at least in part from data associated with operation of the battery within the information handling system as the information handling system is operated over time.

14. The information handling system of claim 12, wherein the data comprises a full charge capacity (FCC) data for the battery, temperature data for the battery, or a charge cycle count data for the battery, or a combination thereof.

15. The information handling system of claim 10, wherein the BMU is configured to use an expected total battery charge capacity degradation rate for the battery in determining the reduced total battery charge capacity ($C_{NEW}$).

16. The information handling system of claim 15, wherein the BMU is further configured to determine new charge currents for a plurality of subsequent charge cycles at regular intervals as the information handling system is operated over time based upon the expected degradation rate for the battery.

17. The information handling system of claim 16, wherein the regular intervals are based upon charge cycle count data for the battery.

18. The information handling system of, wherein the percentage (X) is 80% and the selected amount of time (T) is 1 hour.

* * * * *

UNITED STATES PATENT AND TRADEMARK OFFICE
CERTIFICATE OF CORRECTION

PATENT NO. : 7,518,340 B2
APPLICATION NO. : 11/300721
DATED : April 14, 2009
INVENTOR(S) : Stephen D. Sterz et al.

Page 1 of 1

It is certified that error appears in the above-identified patent and that said Letters Patent is hereby corrected as shown below:

In claim 1, column 10, line 31, after "$R_{NEW}=X(C_{NEW}/C)CT$", delete ";" and insert --; and--.

In claim 10, column 11, line 13, after "(C) for the battery in", delete "a".

In claim 18, column 12, line 27, after "The information handling system of", insert --claim 10--.

Signed and Sealed this

Twenty-sixth Day of May, 2009

JOHN DOLL
*Acting Director of the United States Patent and Trademark Office*